No. 651,391. Patented June 12, 1900.
G. H. SELLERS, Dec'd.
A. W. SELLERS, Executrix.
FILTER.
(Application filed June 14, 1899.)

(No Model.) 5 Sheets—Sheet 1.

Witnesses:

Inventor:

No. 651,391. Patented June 12, 1900.
G. H. SELLERS, Dec'd.
A. W. SELLERS, Executrix.
FILTER.
(Application filed June 14, 1899.)
(No Model.) 5 Sheets—Sheet 4.
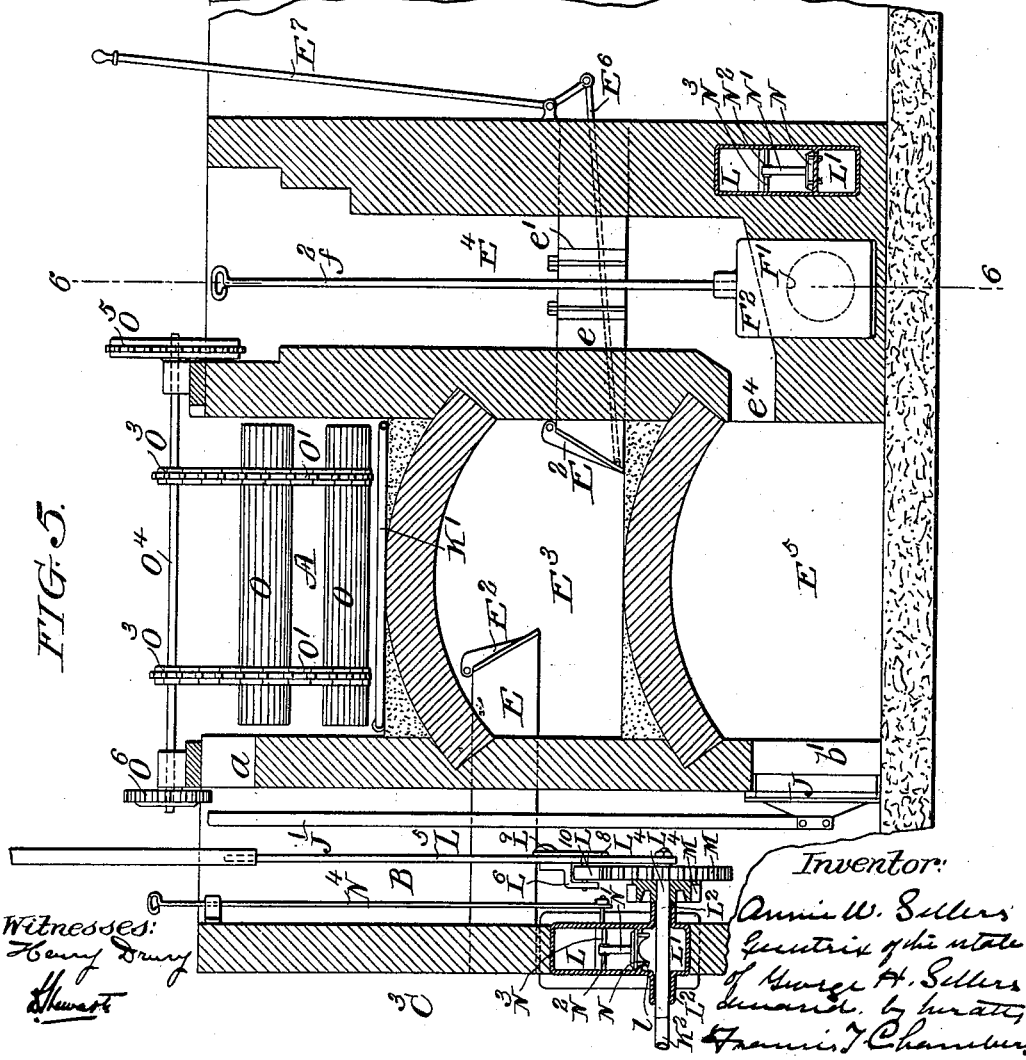

No. 651,391. Patented June 12, 1900.
G. H. SELLERS, Dec'd.
A. W. SELLERS, Executrix.
FILTER.
(Application filed June 14, 1899.)
(No Model.) 5 Sheets—Sheet 5.
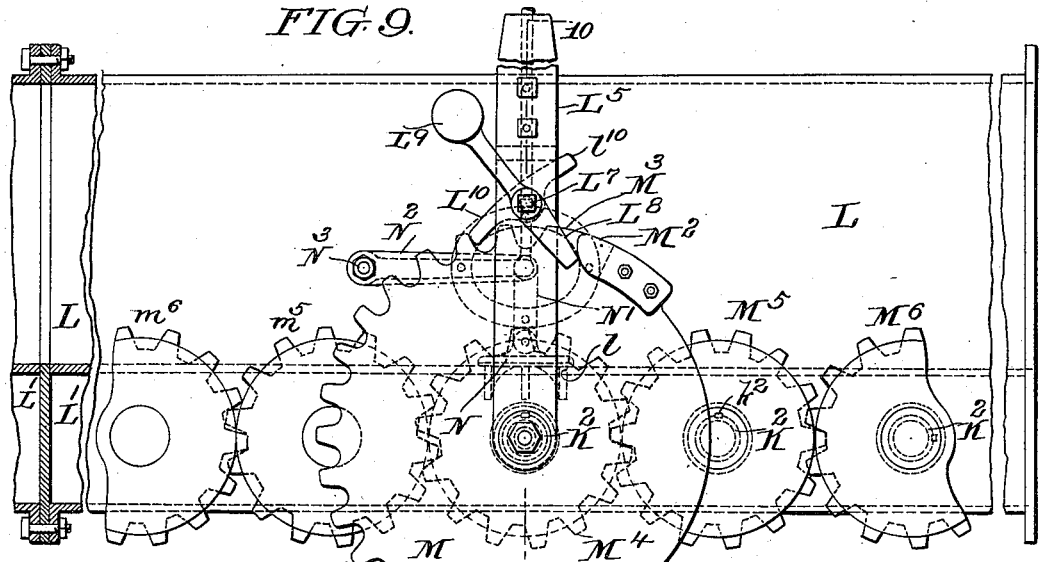
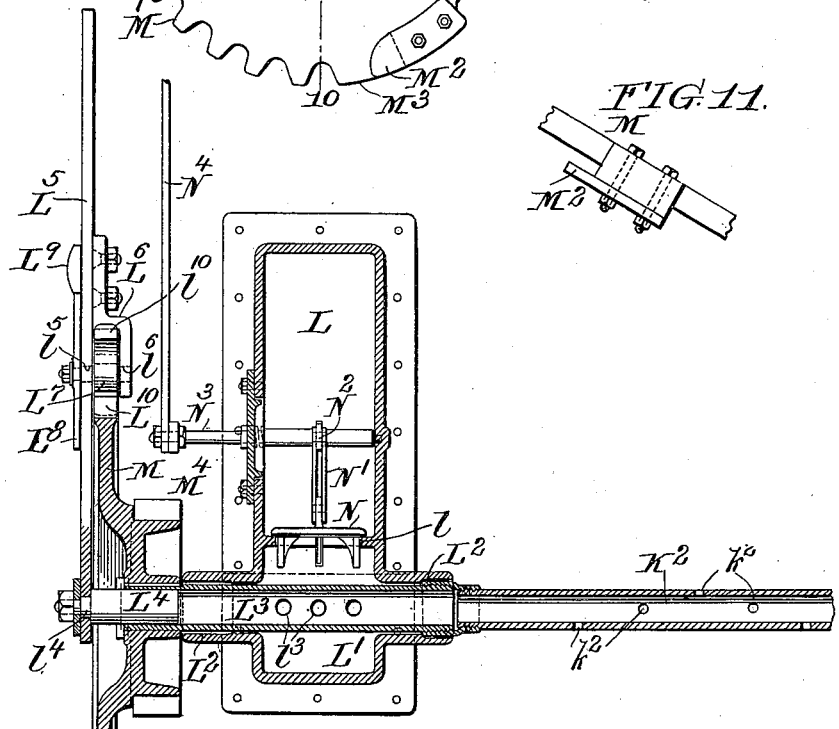
Witnesses:
Inventor:

UNITED STATES PATENT OFFICE.

ANNIE W. SELLERS, OF WILMINGTON, DELAWARE, EXECUTRIX OF GEORGE H. SELLERS, DECEASED, ASSIGNOR TO THE UNITED STATES FILTERING AND PURIFYING COMPANY, OF CAMDEN, NEW JERSEY.

FILTER.

SPECIFICATION forming part of Letters Patent No. 651,391, dated June 12, 1900.

Application filed June 14, 1899. Serial No. 720,467. (No model.)

*To all whom it may concern:*

Be it known that GEORGE H. SELLERS, deceased, late a citizen of the United States of America, and a resident of Wilmington, in the county of New Castle, in the State of Delaware, invented an Improvement in Filters, of which the following is a true and exact description, reference being had to the accompanying drawings, which form a part thereof.

This invention relates to the construction of filters, and has for its object the provision of improved appliances for stirring and cleaning the filter bed or beds and the provision and construction of a filtering system especially adapted to facilitate a double filtration of water, first through an upward and then through a downward filter.

In some respects the invention may be considered as an improvement on the inventor's former patented improvements in filters as shown by his patents dated July 28, 1896, Nos. 564,939, 564,941, 564,942, and 564,943.

The nature of the present improvements will be best understood as described in connection with the drawings in which they are illustrated, and in which—

Figure 1:
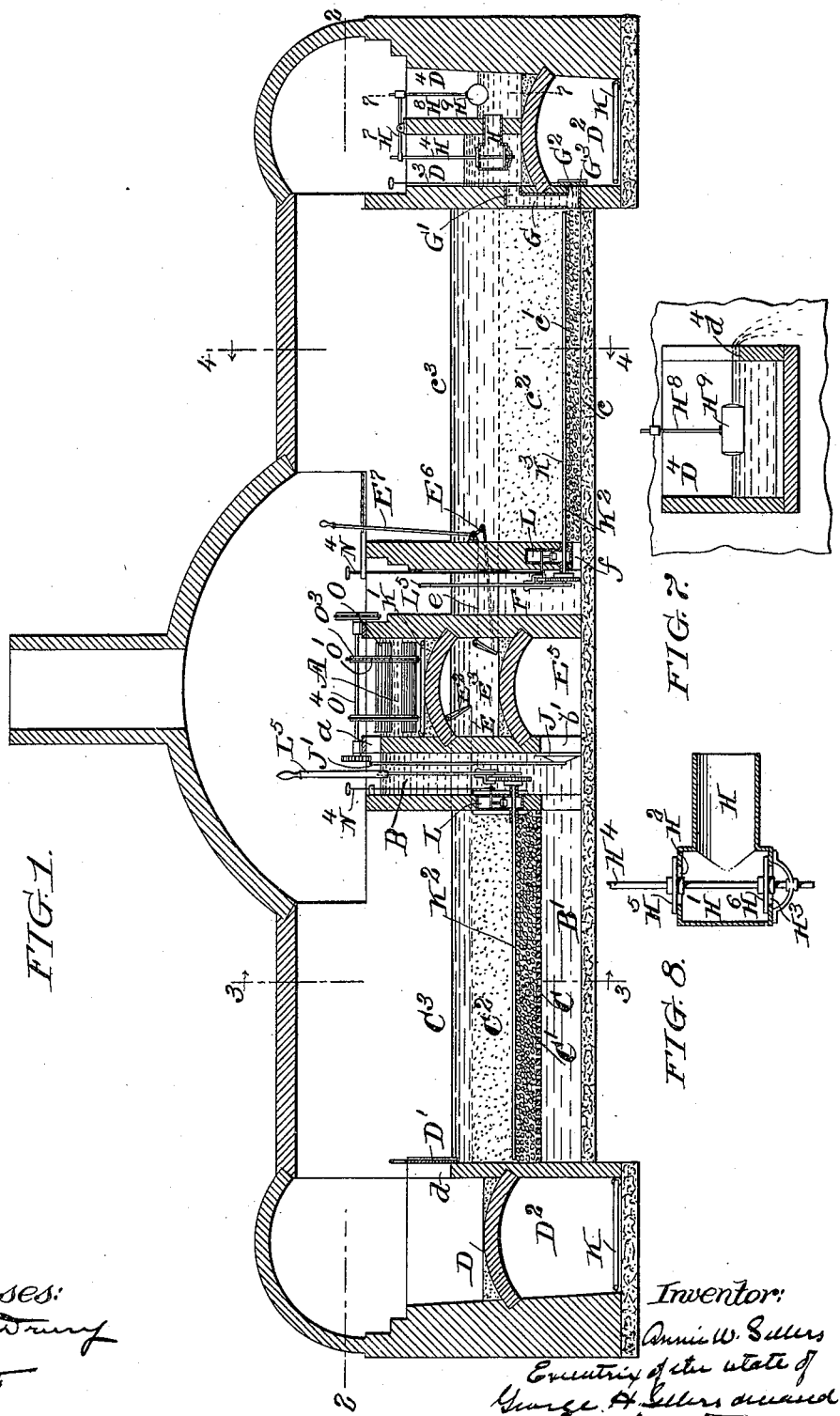
Figure 2:
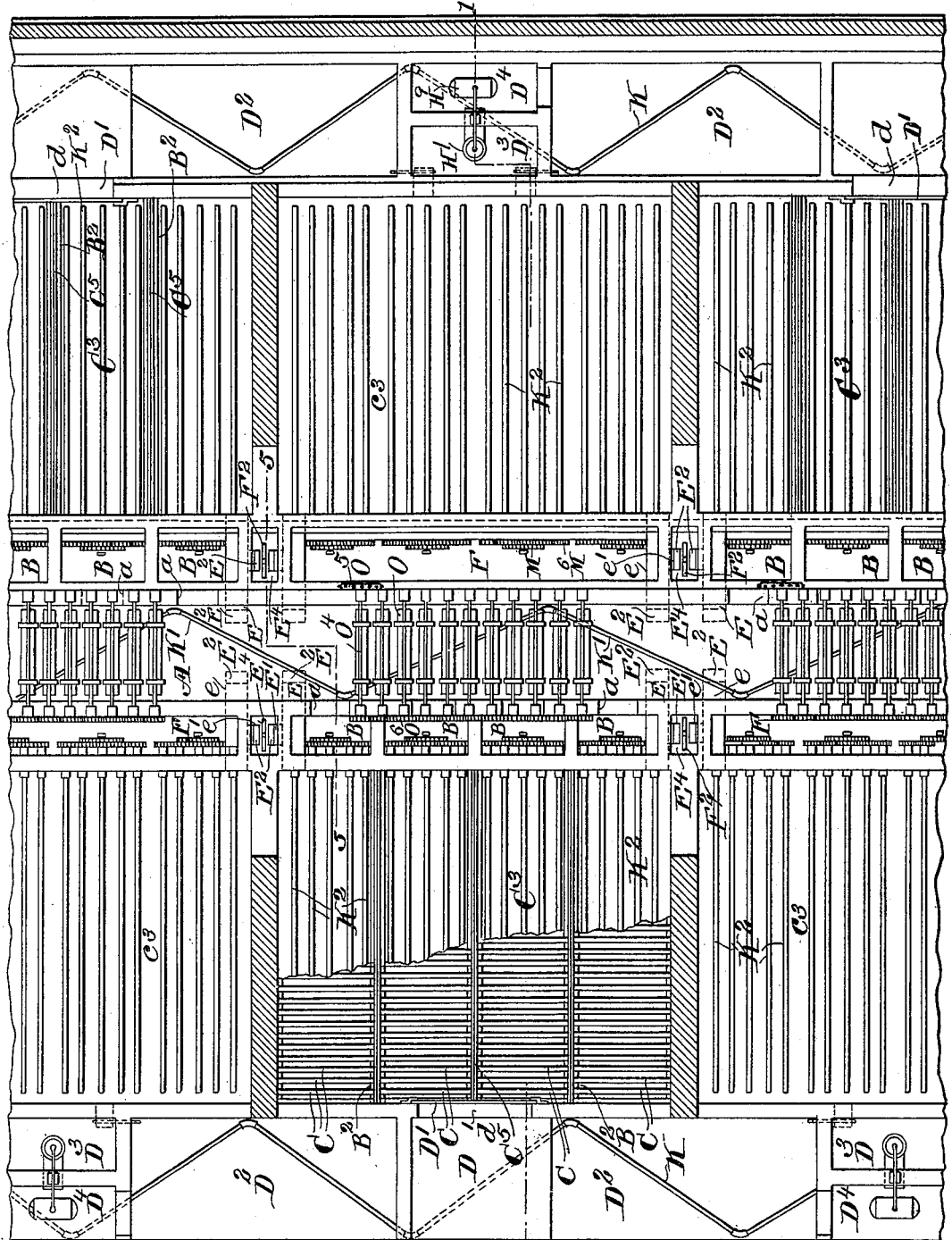
Figure 3:
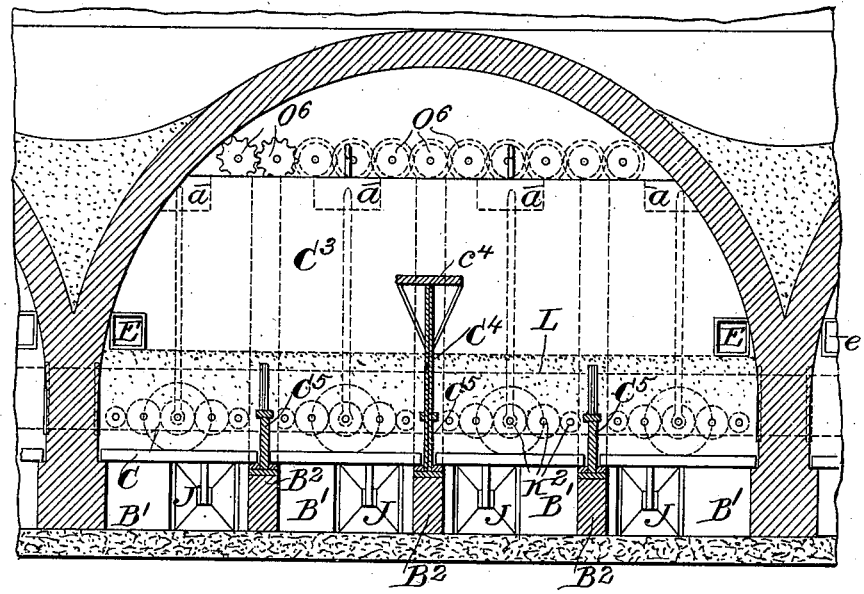
Figure 4:
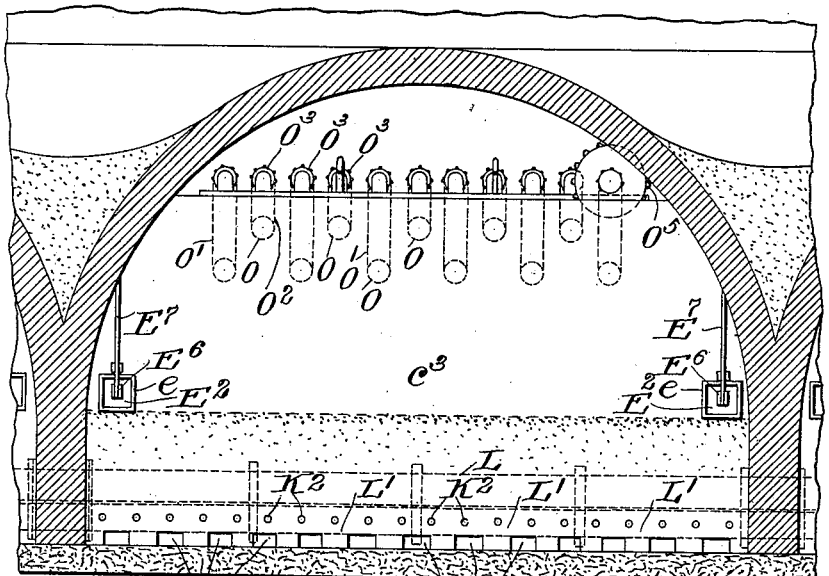

Figure 1 is a cross-sectional view through the inventor's composite filter. Fig. 2 is a plan view taken as on the section-line 2 2 of Fig. 1. Fig. 3 is a longitudinal section through one of the upward filters, taken as on the section-line 3 3 of Fig. 1. Fig. 4 is a longitudinal section through one of the downward filters, taken as on the section-line 4 4 of Fig. 1. Fig. 5 is a cross-section taken as on the irregular line 5 5 of Fig. 2 and shown on an enlarged scale. Fig. 6 is a section taken as on the line 6 6 of Fig. 5. Fig. 7 is a section on the line 7 7 of Fig. 1. Fig. 8 is a view of the regulating-valve shown at the right of Fig. 1, on a somewhat-larger scale. Fig. 9 is an enlarged rear view showing the appliances for introducing fluid under pressure into the body of the filter-beds. Fig. 10 is a cross-sectional view on the line 10 10 of Fig. 9; and Fig. 11 is a large view of a portion of the toothed wheel $m$, showing the arrangement of its fingers $m^2$.

A, Figs. 1, 2, and 5, is a raceway for the supply of the water to be filtered, as shown, and preferably it is situated in a level position between two sets of filter-beds having the construction hereinafter to be described. In this raceway bundles of iron rods (indicated at O O) are suspended on belts or chains O' O', passing at top over pulleys $O^3$ on a series of shafts $O^4$, having gear-wheels $O^6$ at their ends in engagement with each other, $O^5$ indicating a driven gear-wheel attached to one of the shafts and by which a series of the metallic bundles are kept in motion through the engagement of the gear-wheels $O^6$. This is substantially the device described in the inventor's earlier patents before mentioned.

On each side of the raceway A and between it and the filter-chamber are narrow passages divided by partition-walls, as shown, so as to form in the first place a series of groups of vertical downtake-passages, (indicated at B B, &c.,) each of which connects with the raceway through a passage such as is indicated at $a$. As shown, four downtake-passages B are grouped together, and at the end of each group is formed another vertical passage, (indicated by the symbol $E^4$,) which opens at bottom to a port $e^4$ into a waste-water conduit or raceway $E^5$, which is situated below the raceway A and with its bottom flush with or below the bottom of the filter-beds. Between each pair of downtake-passages $E^4$ occurring in the same narrow vertical division is formed a passage F, extending along the end of and opening at bottom into one of the downward-filter chambers, the openings being indicated at $f$ in Fig. 4. The downtake-passages B each connect at bottom with horizontal tunnels B', separated by vertical walls $B^2$ $B^2$, &c., (see Fig. 3,) which serve to support a grating, (indicated at C,) upon which is supported the filter-bed, (indicated at C' $C^2$, C' indicating the coarser underlying stratum, and $C^2$ the finer overlying material.) The filtering-bed lying above each group of tunnels B' is divided into sections corresponding with the underlying tunnels by means of vertical partitions, such as are indicated at $C^5$ and which extend from the walls $B^2$ to or nearly to the top of the filter-bed. As shown, each filter-chamber $C^3$ is supplied by four tunnels B' and has its bed divided into four corresponding sections by three partitions C⁵. Preferably and as shown the central partition is continued up above the water-level of the filter-chamber C³, dividing each such chamber into two divisions, each having two tunnels beneath them. As shown, the divisional line is used also to support a footway, (indicated at $c^4$.)

$b'\ b'$, &c., indicate an opening leading from each horizontal tunnel B' into the waste-water conduit E⁵, and J indicates gates for closing these openings, each gate having an actuating-rod J', by which it may be raised to open the passage and lowered to close it. From each filter-chamber C³, and when such chamber is divided by a wall C⁴ from each division of it, leads a delivery-conduit E, which opens into a water-conduit E³, preferably formed, as shown, beneath the race A and above the waste-water conduit E⁵. These conduits E are provided with valves E², which by any convenient mechanism—such, for instance, as that indicated at the right hand of Fig. 5 and which consists of a rod E⁶, attached to the hinged gate E² and actuated by a lever E⁷—may be opened and closed at will. As shown in the drawings, the conduits E are situated close to the downtake-passages E⁴, (see Fig. 6,) and a lateral conduit E' is provided, leading out of each conduit E into this downtake-passage and of course provided with a gate, as indicated at E², which gates may be actuated by any convenient mechanism.

$c^3\ c^3$ indicate downward-filter chambers, such chambers being preferably arranged, as shown, in alternation with the upward filters C³ in linear sets of filter-chambers on each side of the raceways.

$c^2$ indicates the finer and $c'$ the coarser filtering material in the chambers $c^3$, and from the outer ends or sides of these chambers is led a pipe G, serving as an uptake leading from the bottom of the filter-chamber to a valve-chamber D³, which communicates through a conduit H with a float-chamber D⁴, having an overflow-wall $d^4$, as indicated in Fig. 7, over which the water flows into the filtered-water conduit D². A regulating-valve is provided in the chamber D³, the construction of which may advantageously be as shown in Figs. 1 and 8—that is to say, a vertical cylindrical section H' is secured to the end of the conduit H and formed with openings H² and H³ in its ends. Working through this cylinder is a rod H⁴, having attached disk valves H⁵ and H⁶, adapted to close the openings in the cylinder, the rod being connected at the top to a central pivoted lever H⁷, from the other end of which depends a rod H⁸, having at its end a float H⁹, the whole arrangement being such that when the water in the chamber D⁴ is flush with the top of the wall $d^4$ the valve in the chamber D³ is open to its maximum extent, while an inflow of water through pipe H into the chamber D⁴, raising the level of the water slightly above the top of the wall $d^4$, will cause the valve to close, or nearly so. By this device the flow of water out of the downward-filter chambers into the conduit D² can be nicely regulated and the level of the water in all of the filter-chambers be kept practically constant, the passage of the water through the filtering material being thus made gradual and with great evenness of flow.

At $d\ d$, &c., are indicated overflow-passages leading from the upward-filter chamber C³ into the conduits D², and opposite to these openings, which are provided with gates D' for closing them, are shown arched platforms D, which give ready access to these filter-beds.

It will be noticed that the downtake-passages E⁴ open into the upper part of the waste-water conduit E⁵ and that below them is formed a channel F', connecting the chamber F with adjacent downtake-passages B. This channel F is normally closed by a valve F², (see Figs. 5 and 6,) $f^2$ indicating a rod by which the valve can be opened from above.

$e$ indicates a channel leading from the water-conduit E³ into the downward-filter beds $c^3$. Like the conduits E, these conduits are provided with valves E² and also with laterally-extending conduits $e'$, leading into the downtake-passages E⁴ and provided, like the similar passages E', with gates.

L L are conduits or boxes which, as shown, are set in the masonry of the inner walls of the filter-chambers and divided at bottom by convenient partitions into four chambers L' L', &c., communicating with the main box L by a port or opening $l$. (Best shown in Fig. 10.) In each box or divisional compartment L' is formed a series of bearings L², &c., arranged in pairs opposite to each other and serving as supports and bearings for a pipe-section L³, opening into the box through perforations $l^3$ and closed at one end, as by a plug L⁴, while at their other end these pipe-sections L³ are coupled with perforated pipe-sections K², the perforations being indicated at $k^2$ and the pipe-sections extending through the body of the filtering material in parallel groups of five each. In the case of the upward-filter chambers one such group is situated in each division of the filter-bed. On the plugged ends of the pipe-sections L³ are secured gear-wheels M⁴ M⁵ M⁶ $m^5\ m^6$, the teeth of which are engaged with each other, as indicated in Fig. 9, so that the rotation of any one of them causes the rotation of the entire system and the coincident rotation of each pipe-section K² on its own axis. As a convenient device for effecting the rotation of the pipe-sections a wheel M is shown, having a segment M' of its periphery provided with teeth, and on each end of this segment a projecting finger M² is provided. Pivoted on the same center as the said wheel, which in the construction shown is a stud $l^4$ of the plug L⁴, is a lever L⁵, having attached to it a bracket L⁶, bearings $l^5$ and $l^6$ being formed through the lever and permitted to support a spindle $L^7$, to which is attached a double-acting pawl $L^{10}$ $l^{10}$, also an upwardly-extending weighted arm $L^9$ and a downwardly-extending finger $L^8$. The weighted arm $L^9$ acts to hold either end of the double-acting pawl in operative position with regard to the toothed segment $M'$ of the wheel, and the finger $L^8$ is arranged, as shown, in such position that as the segmental toothed wheel revolves the finger will finally go against one of the fingers $M^2$, and on that happening a motion of the lever $L^5$ toward the finger $M^2$ will throw the weighted arm $L^9$ to the other side of the center line and the other arm of the pawl into operative position. It will be obvious that with these devices a reciprocating movement of the lever-arm $L^5$ will result in a rotative movement of the wheel M and that the direction of this movement will be automatically reversed whenever the pawl comes to the end of the toothed segment. The result is of course to alternately and partly rotate each of the group of pipes $K^2$ in opposite directions. N N, &c., indicate valves adapted to close the openings $l$, leading from the box L to the divisional boxes $L'$. These valves, as shown, are connected by links $N'$ with the end of a lever-arm $N^2$, which in turn is attached to a shaft $N^3$, one end of which passes the conduit or box L and is provided with an actuating-lever $N^4$, by means of which the valve can be opened or closed at will. It will be understood that each box L is connected by a conduit (not shown) with the source of fluid under pressure. Such fluid may be water or air—in some cases steam—and obviously by a manipulation of the valve N this fluid can be admitted at will through any individual group of pipes $K^2$ to the filter-bed or sections thereof, and the group of perforated pipes in use can be rotated on their own axes, so as to distribute the stirring effect of the fluid issuing through the perforations $k^2$.

In use the water to be filtered passes from the race A to the gates $a$ and the separate downtake-passages B to the horizontal tunnels $B'$, thence upward through the divisional filter-beds of the chambers $C^3$, thence through the conduits E into the conduit $E^3$, thence through the conduits $e$ into the downward-filter chamber $c^3$, and thence through pipe G and its opening $G'$ into chamber $D^3$, from which it passes with regulated speed through the valve-passage H into the float-chamber $D^4$ and thence into the filtered-water conduit $D^2$. Where it is desired to empty the downward-filter chamber $c^3$, an opening $G^2$, leading directly into the conduit $D^2$, can be opened by moving its valve $G^3$. Where it is desired to wash one of the upward-filter chambers, some or all of the gates J are opened, permitting the water accumulated in and above the bed to flow downward into the waste-water conduit $E^5$, and by closing the delivery-conduit E and also closing the gate $D'$ the accumulation of water in each chamber $C^3$ can be made greater than normal, if desired, as a preparation for such a washing-out treatment. The construction of the chambers $C^3$ is such, however, as to permit of other manipulations in washing down. Thus, for instance, by opening one gate J the water in the division of the filter immediately above it will run downward into the waste-water conduit, while the water in the division of the filter separated by the partition $C^5$ will still continue to flow upward through it and then over said partition and downward to waste. In this way the accumulated water the passage of which through the filter in a reverse direction is relied upon for washing is reinforced, and it will be understood that in the process of washing the filter the pressure fluid is to be introduced through the pipes $K^2$ in such manner as may be considered most advantageous, the effect in all cases being to stir up the bed of filtering material and assist the water flowing through it, either in an upward or downward direction, in freeing and carrying away impurities. The construction shown also enables the upward filter to be washed while the water is still passing through it in normal direction—that is to say, the pressure fluid may be introduced through the pipes $K^2$ with consequent liberation of impurities from the filtering material—and while this is going on the gate at the end of the pipe E, leading into the chamber $E^3$, is closed, while the gate at the end of the conduit-section $e'$, leading into the downtake-passage $E^4$, is opened.

With regard to the downward-filter chambers $c^3$ it will be obvious that water can be introduced into the bottoms of these chambers by opening the valves $f^2$, permitting a flow of water from one of the downtake-passages B into the passage F and thence through the ports or passages $f$ into the bottom of the filter. Under these conditions the water can be drawn off from the top of the filter-bed by closing the gate of the conduit $e$, connecting it with the conduit $E^3$, and opening the gate in the conduit $e'$, connecting it with the downtake-passage $E^4$. The filtering material can be stirred, as in the case of the other chambers, by means of pressure fluid admitted through the groups of perforated pipes $K^2$.

Having described this invention, what is claimed as new, and is desired to be secured by Letters Patent, is—

1. An upward filter having two or more independent supply-tunnels, as $B'$ $B'$, each having a gated outlet leading to waste, a bed supported above the tunnels $B'$ $B'$ and divided by partitions into sections corresponding to the independent tunnels $B'$ and connecting with each other only at or near the top of the filter-bed, sets of stirring devices each consisting of a series of horizontal perforated pipes buried in the different sections of the filter-bed, independent means for supplying fluid at will to each set of pipes and independent means for rotating each set of pipes on their own axes.

2. In combination with a filter-bed, a fluid-supply chamber as L', means, as valve N, for controlling the supply of fluid thereto, a series of bearings $L^2$ $L^2$ arranged opposite to each other in pairs in the walls of chamber L', a series of parallel perforated pipes $K^2$ $L^3$, the portions $L^3$ resting in bearings $L^2$ and having perforations $l^3$ opening into chamber L', a series of gear-wheels, as $M^4$ $M^5$ $M^6$ &c., secured on the outer ends of pipe-sections $L^3$ and in engagement with each other, and means for rotating said gear and through them the perforated pipes.

3. In combination with a filter-bed, a fluid-supply chamber as L', means, as valve N, for controlling the supply of fluid thereto, a series of bearings $L^2$ $L^2$ arranged opposite to each other in pairs in the walls of chamber L', a series of parallel perforated pipes $K^2$ $L^3$, the portions $L^3$ resting in bearings $L^2$ and having perforations $l^3$ opening into chamber L', a series of gear-wheels, as $M^4$ $M^5$ $M^6$ &c., secured on the outer ends of pipe-sections $L^3$ and in engagement with each other, a segmentally-toothed wheel M connected to operate the gear-train aforesaid and having fingers $M^2$ $M^2$ secured to it at each end of the toothed segment, a lever $L^5$ pivoted concentrically with wheel M, a double pawl $L^{10}$ $l^{10}$ pivoted on the lever in position to engage the teeth of the segment on wheel M, a weight, as $L^9$, secured to the same spindle as the pawl and extending above said pawl as described, and a finger, as $L^8$, also secured to the same spindle and arranged to engage the fingers $M^2$ $M^2$ as described and whereby the motion of the segmentally-toothed wheel is automatically reversed.

4. A filter having in combination a series of upward-filter beds, as $C^3$, and a series of downward-filter beds as $c^3$, a water-conduit, as $E^3$, delivery-conduits, as E, leading thereto from each upward filter and supply-conduits, as $e$, leading therefrom to each downward filter.

5. A filter having in combination a series of upward-filter beds, as $C^3$, and a series of downward-filter beds as $c^3$, a water-conduit, as $E^3$, delivery-conduits, as E, leading thereto from each upward filter and supply-conduits, as $e$, leading therefrom to each downward filter, a filtered-water conduit, as $D^2$, and uptake delivery-conduits connecting the downward-filter chambers and conduit $D^2$ whereby the water-level in the filter-chambers is maintained at an approximately-definite point.

6. A filter having in combination a series of upward-filter beds, as $C^3$, and a series of downward-filter beds as $c^3$, a water-conduit, as $E^3$, delivery-conduits, as E, leading thereto from each upward filter and supply-conduits, as $e$, leading therefrom to each downward filter, a filtered-water conduit, as $D^2$, a valve-chamber $D^3$ connected with the bottom of each downward-filter chamber by an uptake-pipe, as G, a float-chamber, $D^4$, connecting with chamber $D^3$ by a conduit H, and having an overflow-wall $d^4$ and a governing-valve regulating the flow of water through conduit H and operated by a float in chamber $D^4$, as described.

7. A filter having in combination a series of upward-filter beds, as $C^3$, and a series of downward-filter beds as $c^3$, a water-conduit, as $E^3$, delivery-conduits, as E, leading thereto from each upward filter and supply-conduits, as $e$, leading therefrom to each downward filter, valves, as $E^2$, for opening and closing conduits E and $e$, conduits, as E' E', leading from the upper part of each filter-bed to waste, valves for controlling said conduits E' and means for supplying water to the bottom as well as the top of the downward-filter chambers.

8. A filter having two sets of alternately-disposed upward and downward filter chambers, as $C^3$ and $c^3$, an elevated raceway, as A, for supplying water to the filters situated between said sets of chambers, conduits B B &c. leading from the race to the upward filters, a conduit $E^3$ situated below the race A, gated delivery-conduits leading from the tops of the upward filters into said conduit $E^3$, gated delivery-conduits leading from conduit $E^3$ to the downward filters, a waste-water conduit $E^5$ situated below conduit $E^3$, gated openings $b'$ leading from the bottom of conduits B into said waste-water conduit, means, as conduits E' $e'$, for drawing off water from the tops of the filters into the waste-water conduit and filtered-water conduits as $D^2$ $D^2$ on the outside of each set of filter-chambers.

ANNIE W. SELLERS,
*Executrix of the estate of George H. Sellers, deceased.*

Witnesses:
ALICE P. SELLERS,
FRANCIS G. SELLERS.